United States Patent [19]

Moisan et al.

[11] Patent Number: 4,779,215

[45] Date of Patent: Oct. 18, 1988

[54] METHOD AND DEVICE FOR MEASURING BY CORRELATION, IN REAL TIME, THE DELAYS BETWEEN MATCHING ELECTRICAL SIGNALS

[75] Inventors: Eric Moisan, Grenoble; Jean-Paul Henrioux, Biviers; Philippe Galet, Le Grand Lemps, all of France

[73] Assignees: Centre National de la Recherche Scientifique (C.N.R.S.), Paris; Centre Technique de l'Industrie des Papiers, Cartons et Celluloses (C.T.F.), Saint Martin D'Heres, both of France

[21] Appl. No.: 716,476

[22] Filed: Mar. 27, 1985

[30] Foreign Application Priority Data

Mar. 28, 1984 [FR] France ................... 84 05122

[51] Int. Cl.⁴ ............... G06F 15/20; G06F 15/336
[52] U.S. Cl. ................... 364/569; 364/565; 364/728.06; 324/161; 73/514
[58] Field of Search ............ 364/569, 565, 604; 356/28; 324/160, 161; 73/514, 517 R, 518

[56] References Cited

U.S. PATENT DOCUMENTS

| | | | |
|---|---|---|---|
| 3,906,213 | 9/1975 | Meriaux et al. | 364/569 |
| 4,019,038 | 4/1977 | Critten et al. | 364/728 |
| 4,053,888 | 10/1977 | Robin et al. | 364/569 |
| 4,100,599 | 7/1978 | Nally | 364/565 |
| 4,285,046 | 8/1981 | Henry | 364/569 |
| 4,430,722 | 2/1984 | Massen et al. | 364/728 |
| 4,604,717 | 8/1986 | Kaplan | 364/569 |

FOREIGN PATENT DOCUMENTS

| | | | |
|---|---|---|---|
| 241555 | 2/1961 | Australia | 364/569 |
| 0065906 | 12/1982 | European Pat. Off. | |
| 2544821 | 4/1977 | Fed. Rep. of Germany | |
| 1566181 | 4/1980 | Fed. Rep. of Germany | |
| 2206872 | 10/1972 | France | |
| 822037 | 4/1981 | U.S.S.R. | 356/28 |
| 2011621 | 7/1979 | United Kingdom | |

Primary Examiner—Parshotam S. Lall
Assistant Examiner—Brian M. Mattson
Attorney, Agent, or Firm—Weingarten, Schurgin, Gagnebin & Hayes

[57] ABSTRACT

Plural independent delay lines are connected in parallel and receive a first signal taken from a first point. Samples of the first signal are taken at different sampling frequencies and are respectively stored in the several delay lines. Samples of a second signal are taken from a second point and are stored in a direct line at one of the frequencies. The correlation function between the samples of the direct line and the samples of one of the delay lines is calculated. Exemplary applications include measuring the speed of a linearly translating object, such as a web of paper.

12 Claims, 3 Drawing Sheets

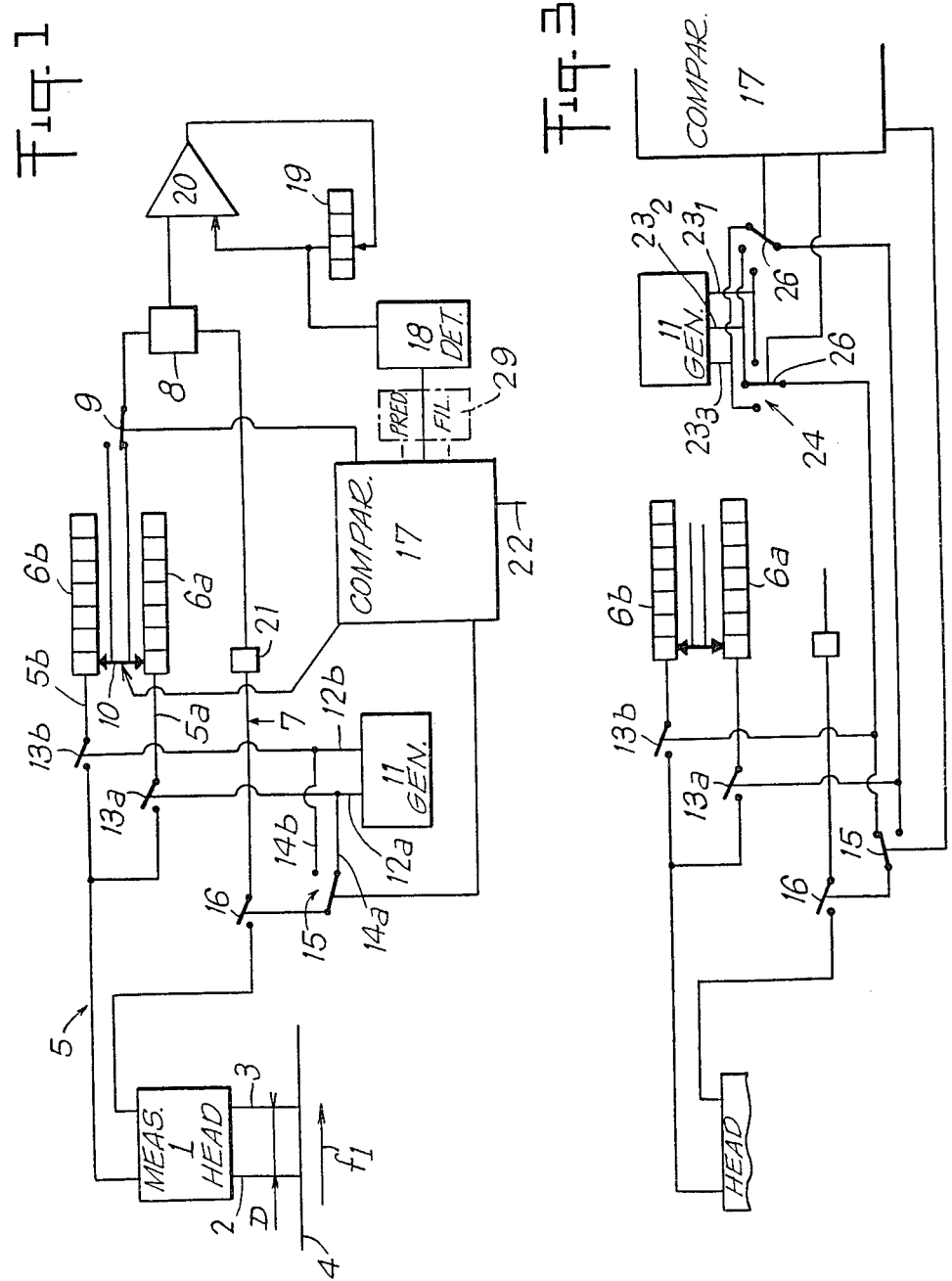

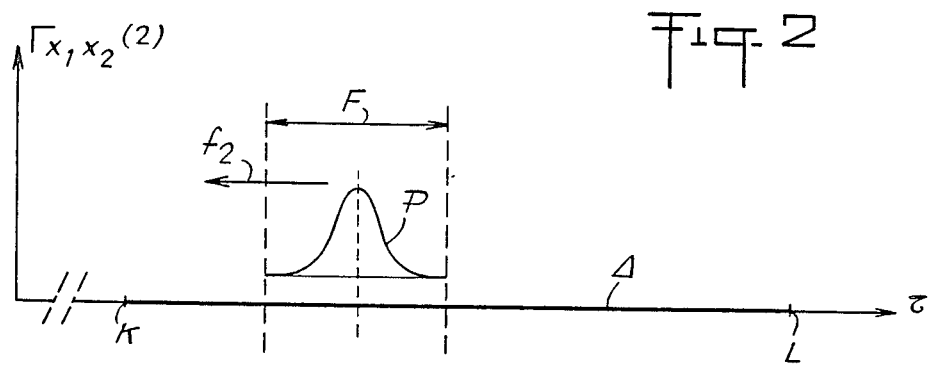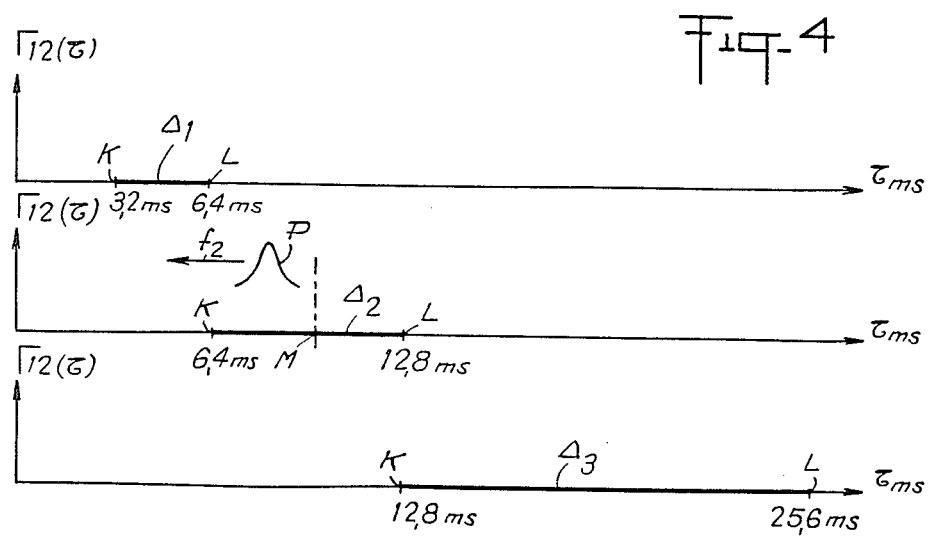

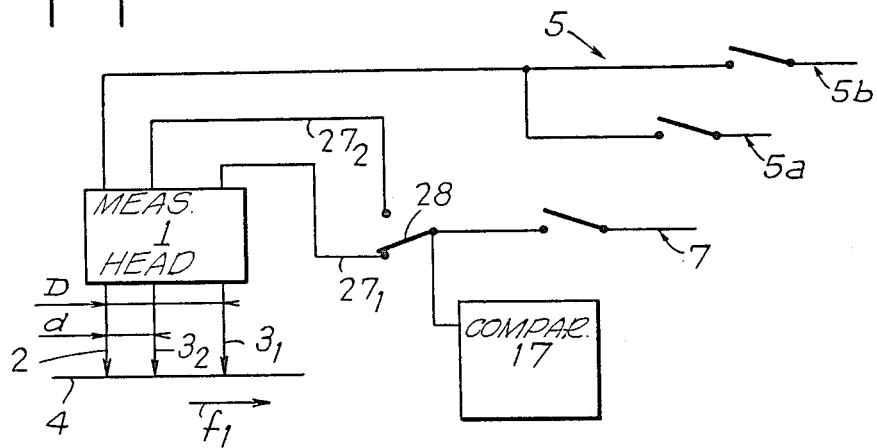
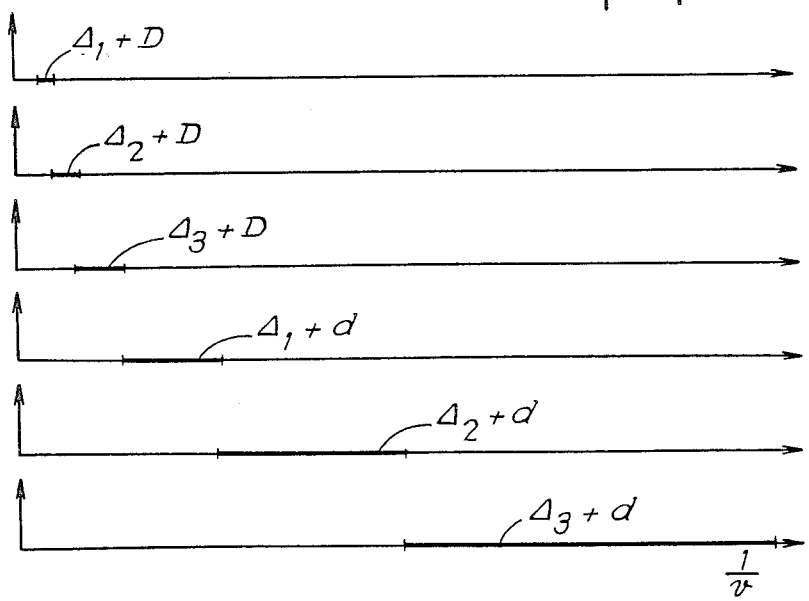

METHOD AND DEVICE FOR MEASURING BY CORRELATION, IN REAL TIME, THE DELAYS BETWEEN MATCHING ELECTRICAL SIGNALS

BACKGROUND AND FIELD OF THE INVENTION

The present invention relates to a method for measuring, by correlation, delays between two matching signals.

The measuring technique used is well known. It consists in sampling two electrical signals in two points respectively situated at a predetermined fixed distance from a movable medium having a non-homogenous type surface.

One of the signals is sampled at a first point and stored in a delay line, whereas the second signal is sampled at a second point and conveyed on a direct processing line. The method then consists in searching through the package of the delay line for the first signal which has a degree of resemblance with the second signal to enable a measurement of a delay by correlation. Such measurement permits, as a function of the distance between the two sampling points, to determine the speed of a moving object and/or the length covered between the two points through one time unit.

The measuring method used consists in calculating the correlation function between two signals sampled at the same frequency for the delay line and for the direct line, and in determining the delay corresponding to the maximum or peak of said function.

The principle of that technique is considered as well-known and accessible to anyone skilled in the art from numerous publications, so that it will not be necessary for the comprehension of the invention to describe it any further.

To carry out said function, the prior art technique suggests a correlation apparatus of a scientific nature permitting to obtain cross-correlation functions. But such apparatus may often by complex to use and do not give a direct reading of the delay linked to the time lag between two matching signals.

French Pat. No. 2 206 872 teaches that the correlation function can only be calculated from the polarity of the sampled signals. According to said French patent, it appears that the position of the cross-correlation peak, which is significant of the delay between two matching signals, gives an unbiased estimation of the delay, solely in the case of stationary signals.

There is another family of devices, called limited-delay devices or regulated sampling frequency devices. But said devices only calculate the cross-correlation function in its maximum point and they have the disadvantage of being regulated on parasitic peaks, non-significant of the cross-correlation function.

European Patent Application No. 0 026 877 describes a correlation apparatus for industrial use, applying the technique of coincidence of polarity. Such an apparatus comprises a microprocessor calculating only part of the approximated correlation function, and detecting the position of the peak in order to calculate and display the value of the delay to be measured. Said apparatus uses a controlled analysis window and a preprogrammed sampling frequency. Yet said apparatus has a relatively long measuring time, about one second, and so cannot be used for measuring delays particularly known to vary quickly and over a wide range.

When the range of delays to be measured is small, it is known to just calculate only a part of the cross-correlation function. This enables one to limit the number of points to be calculated during a sampling period, and as a result to limit the size of the memory. As a consequence, the computing power necessary to real-time working is reduced, as well as the risks of errors in peaks detection.

If with such means, the object is to process a wide range of delays, it is possible to move the window inside which the cross-correlation function is calculated, as this is taught in European Patent Application No. 0 026 877.

It is possible, in order to limit the size of the memory of the delay line, to provide a sub-sampling for one of the two lines as in European Application No. 0 026 877. But the disadvantage of this method is that it is slow.

It is also known from British Pat. No. 1 566 181, to use for the same purpose, a plurality of sampling frequencies, one of which is always in use in relation to the delay to be measured. The method has the disadvantage of creating an unusable transient state at each frequency change, since it is necessary to wait for the register of the delay line to be loaded with the samples taken at the new frequency before calculating the cross-correlation function.

The aforesaid methods enable to save on equipment and to quicken up the calculations. But these means are not altogether sufficient for measuring quick-varying delays over wide ranges, namely when the measures to be made concern signals sampled from a movable object undergoing sudden accelerations and decelerations.

The methods and apparatus of the aforedescribed type cannot therefore be used practically for measuring velocities and/or lengths travelled by industrial products manufactured in continuous manner, such as webs of paper or metal wires, or else, for assessing displacements in transports by rail or cable. In all these cases, the acceleration and decelerations can be considered as being high, so that the delivered signals are not of a sufficiently stationary nature to be processed by the known means.

SUMMARY OF THE INVENTION

IT is the object of the present invention to overcome this drawback by proposing a new method and a new device particularly designed for measuring, by direct reading, but without any physical contact, variations in the advancing movement of a product with a non-homogeneous type surface, moved with respect to a measuring head.

The object of the invention is to enable the measurement of delays between two matching signals by means of a technique calculating the correlation function taking into account the variations in time which can spread over a wide range.

To this effect, the method according to the invention for measuring by correlation is characterized in that:
n independent lines, which are connected in parallel, are provided for receiving a first signal at a first point, n being equal to or greater than two,
samples of said first signal taken at n different sampling frequencies are stored in said n delayed lines respectively,
samples of a second signal are taken in the direct line at one of said n frequencies, and
the correlation function between the samples of the direct line and the samples of one of said n independent delay lines is calculated, said one of said n independent delay lines being determined as a function of the value of the measured delay.

The invention also relates, as a new industrial product, to a device for measuring by correlation, which comprises:
  n delay storage lines, associated with a first sensor, n being equal or greater than two,
  a generator of n different sampling frequencies being simultaneously applied to said n delay lines respectively,
  synchronization means for applying to a direct line the sampling frequency of one of the delay lines,
  switching means for applying to one of the inputs of a multiplier, the samples stored in one of the delay lines,
  and a programmed data comparator having an input connected to the output of the peak detector and outputs controlling the synchronization means, the switching means, as well as the multiplier and an adder for the calculation of the correlation function.

BRIEF DESCRIPTION OF THE DRAWINGS

The invention will be more readily understood on reading the following description with reference to the accompanying drawings, in which:

FIG. 1 is a diagrammatical view of the device according to the invention.

FIG. 2 is a diagram illustrating one special feature of the invention.

FIG. 3 is a diagram, similar to FIG. 1, but illustrating a variant embodiment of some of the elements constituting the object of the invention.

FIG. 4 is a diagram illustrating an operational characteristic of the invention.

FIG. 5 is a diagram showing part of a variant of the object of the invention.

FIG. 6 is a diagram similar to that of FIG. 4 illustrating one advantageous feature of the invention.

DETAILED DESCRIPTION OF THE INVENTION

According to the invention, it is possible to assess, substantially in real time, quick-varying delays between matching signals sampled from two beams back-scattered by a movable object moving in front of two sources emitting incident beams, parallel together, situated inside the same plane and separated by a fixed distance D.

It is therefore important to measure sudden delay variations with accuracy and in real time, to select a sampling frequency which is such that the period in which the back-scattered signals are sampled, is less than the desired resolution on the smallest delay to be measured, and to very quickly calculate the correlation function. But if the range of variation of the delay is wide, the choice of such a sampling frequency implies calculating a very large number of delay points, this being incompatible with the selected object.

In order to overcome this problem, the invention recommends to produce an apparatus comprising a measuring head 1, of a known type, equipped with a first measurement sensor 2 and a second measurement sensor 3, of optical type for example, both of which are directed perpendicularly onto a movable object 4 advancing in the direction of arrow $f_1$. Thus, sensors 2 and 3 preferably constitute transmitters of incident beams and are situated inside the same plane perpendicularly to the movable object 4, while being separated by a fixed distance D.

According to the invention, the back-scattered signals picked-up by first sensor 2 are directed towards a line 5, called delayed line, comprising at least two lines 5a and 5b leading to shift registers 6a and 6b whose role is to store successively the samples picked-up from said back-scattered signal.

The samples issued from the second sensor 3, and picked-up from the second back-scattered signal, are directed towards a measuring line 7, called direct line, reaching to a multiplier 8 to which also reaches the output of a switch 9 adapted to connect said multiplier with either one of registers 6a or 6b via at least one pointer 10.

According to the invention, the apparatus comprises a generator 11 emitting via two outputs 12a and 12b two sampling frequencies applied to samplers 13a and 13b belonging to lines 5a and 5b. The two outputs 12a and 12b comprise two by-passes 14a and 14b which are connectable independently one from the other, via synchronizing means, with a sampler 16 situated on the direct line 7.

The device further comprises a programmed data comparing device 17 with three outputs controlling, respectively, the switch 9, the range to be scanned by the pointer 10 and the synchronizing means 15. The comparing device 17 has an input connected with a peak detector 18 connected to the output of a memory 19 for the temporary storage of the correlation function, supplied by the output of an adder 20 of which one of the inputs is connected with the output of the multiplier 8. The other input of adder 20 is looped on the memory 19, in such a way as to take into account, for every item or data, the sum of the previously made measurement, added to the measurement given by the multiplier 8.

The frequencies emitted by the generator 11 are so selected as to use delay ranges which appear to be in succession. For example, if the delay range to be measured is between 3.2 milliseconds and 12.8 milliseconds, and if the required resolution is one for one thousand, the lowest sampling period is 3.2 microseconds. If the excursion of the peak of the correlation function is limited to between point K equal to one thousand and point L equal to two thousands, approximately (see FIG. 2), then it is necessary to select a second sampling period at 6.4 microseconds.

Shift registers 6a and 6b are loaded in parallel with samples picked up at different frequencies from the same back-scattered signal.

Data comparing device 17 is designed to assess the position of the peak in the correlation function calculated by the system 6a/6b, 21, 9, 8, 20 and 19. Supposing that this peak is assessed by the preceding measurement as being within a range of delays which can be covered by the lowest sampling frequency, the comparing device 17 controls the synchronizing means 15, in such a way as to apply to the sampler 16 the lowest frequency, for example, that wherein the sampling period is 6.4 microseconds and is delivered by output 12a.

Direct line 7 thus receives the samples issued from sensor 3, at the same frequency as the line 5a of line 5 storing the successive samples in memory 6a.

Simultaneously, data comparing device 17 controls the switch 9 in order to set up a link between multiplier 8 and pointer 10 in relation to memory 6a.

The samples from operating line 5a and those travelling through line 7 are processed in known manner by system 6a/6b,9,8,20 and 19 to calculate the correlation function. Detector 18 looks for the maximum amplitude or peak of the correlation function and transmits it to data comparing device 17. The programming conferred to the comparing device enables it ot assess whether the correlation peak so detected, is always situated, in compatible manner, within the serviceable range determined by the selected sampling frequency.

Supposing that the delay tends to reduce, while the sampling period used is 6.4 microseconds, this corresponds to an acceleration of the movable object 4 and to a displacement of the peak P (FIG. 2) of the correlation function in the direction of arrow $f_2$. From the moment when the displacement of peak P risks to go over point K, the comparing device 17 controls the synchronizing means 15 to apply to the sampler 16 the second frequency supplied by output 12b and already applied to the delayed line 5b which was the pending line. Simultaneously, the switch 9 is controlled by data comparing device 17, so as to establish a connection between the multiplexer 8 and pointer 10, connected with the register 6b of the line 5b which becomes the operating line.

Considering that register 6b has been loaded in parallel manner with samples picked up from the same back-transmitted data, but with the other sampling frequency, the correlation function can be calculated without waiting for the contents of the shift register used, to be renewed. Thus, it becomes possible to measure in real time, delays varying rapidly, as the comparator controls the action of bringing into active service either one of the delayed lines 5a or 5b as a function of the value of the precedingly measured delay.

In order to reduce measuring time and to obtain an even quicker assessment of the varying delays, the calculation of the correlation function is only performed around peak P.

Data comparator 17 is programmed to limit to one window F (FIG. 2) the excursion of pointer 10 which supplies the calculating system. The window F is placed in such a way that peak F is centered with respect thereto. To this effect, the data comparing device 17 adjusts, for every measurement to be done, the position of the window F, in order to center it on the peak of the preceding measurement. A variant consists in controlling the position of the window F by anticipation, by incorporating into the calculation system, between comparing device 17 and detector 18, a predicting filter 29, such as a kalman filter, as illustrated in dash-and-dot lines in FIG. 1. In such a case, the filter 29 receives from detector 18 the estimation data of the delay and transmits to the comparing device 17 the data of speed, acceleration and length.

This gives a quick-working and accurate apparatus permitting to measure, in real time, sudden delay variations which can spread over a wide range.

The data comparing device 17 has a fourth output 22 designed to supply a data or parameter calculation and display means in relation to the measured delay. By way of example, such display means can display the moving speed of a moving object 4 and/or the linear measurement of the travelled path and/or its acceleration.

In certain applications, the delay ranges can be very wide. The storage of the picked-up samples at two different sampling frequencies can, in some cases, prove to be insufficient. FIG. 3 shows a variant embodiment wherein generator 11 has three outputs $23_1$, $23_2$, $23_3$ delivering three different sampling periods $\Delta_1$, $\Delta_2$ and $\Delta_3$ such as diagrammatically illustrated in FIG. 4. In relation to the example described hereinabove, the third frequency can, for example, be selected so that a sampling period of 12.8 microseconds is used to cover an overall delay range of between 3.2 milliseconds and 25.6 milliseconds. In such a case, the data comparing device 17 is so programmed as to always apply, by way of selection means 24 (FIG. 3), two successive frequencies to samplers 13a and 13b. Selection means 24 are, for example, two switches 26 controlled by data comparing device 17 in order to connect two of the three outputs to the two samplers 13a and 13b.

Switches 26 are controlled by data comparing device 17, the position of peak P being assessed with respect to a reference point M, for example a central point equal to $(K+L)/2$ of the delay range corresponding to $\Delta_2$. Thus, with reference to FIG. 4, if the peak P is shifted in the direction of arrow $f_2$ on the left of point M, the comparator controls switches 26 to release to the sampler 13 of the pending line, the frequency which corresponds to period $\Delta_1$. When peak P reaches point K, the comparator switches over the roles of the two delayed lines.

It should be considered that, according to the invention, the samples issued from the first sensor 2 are directed to a delayed line which can comprise more than two lines supplied in parallel, using as many frequencies of their own.

In certain applications, the delay ranges can be very remote from one another and the multiplication of the number of sampling frequencies can then lead to a more complex and expensive device or to a less performing device.

To overcome this disadvantage, the invention proposes to produce the head 1 in such a way that the second sensor 3 can be situated at different distances from the first sensor 2.

According to FIG. 5, it is possible to provide the head 1 with two sensors $3_1$ and $3_2$ each one having an output line $27_1$ and $27_2$ which can be connected by means of a switch 28 to line 7. Switch 28 is controlled by data comparing device 17, so that either of sensors $3_1$, $3_2$ is energized as a function of the delay value determined by the estimation of the position of peak P and of the sampling frequency in use. Thus, for delays considered to be incompatible with for example the three sampling frequencies defined hereinabove, the data comparing device 17 keeps in operation sensor $3_1$ situated at a distance D from the first sensor 2. As soon as the delays increase, correspondingly to an acceleration of the movement in the direction of arrow $f_1$, data comparing device 17 brings into operation the sensor $3_2$ situated at a distance d from the first sensor 2.

FIGS. 6 illustrates the case of three sampling periods $\Delta$ situated within a ratio 2, and the case of two distances D, d situated within a ratio $2^3$. In said figure, the x-axis corresponds to the reverse of the speed which can be measured by opposition to the delays shown in FIG. 4. An examination of said figure reveals that the combination of the three frequencies and of the two distances enables to increase considerably the total range of measurable delays.

The invention is in no way limited to the description given hereinabove, and on the contrary covers any modifications that can be brought thereto without departing from its scope.

What we claim is:

1. A method for measuring by correlation, in real-time, delays between matching electrical signals, comprising the steps of:

sampling at n sampling frequencies variations at a first fixed point of a first signal to provide samples thereof, which first signal is supplied in response to a movable object, where n is at least equal to two;

storing in n parallel delay lines the samples such that each different sampling frequency is respectively stored in an associated delay line;

sampling at one of said sampling frequencies, variations of a second signal to provide samples thereof, which second signal is supplied in response to the movable object at a fixed second point at a predetermined distance from said first point;

storing the samples of the second signal in a direct line at said one of said sampling frequencies;

calculating a correlation function between the samples in the direct line and the samples of a preselected one of said n delay lines;

first determining position of a peak of said correlation function and then determining a corresponding delay therefrom; and said preselected one of said delay lines being selected as a function of said delay.

2. The method of claim 1, further including the step of synchronizing the sampling of the direct line with that of the delay lines.

3. The method of claim 2, wherein first signal sampling is sampled at two sampling frequencies and in associated two delay lines.

4. The method of claim 3, wherein the calculating of the correlation function includes using a delay window peak centered on the function to be calculated.

5. The method of claim 4, wherein said calculating step includes using a delay window peak centered on the function to be calculated where the peak is given by a previous iteration.

6. The method of claim 4, further including the step of using a predicting filter so as to allow said delay window to be peak centered on the function to be calculated.

7. The method of claim 1, wherein said second signal sampling step includes using any one of a plurality of sensors.

8. A device for measuring by correlation, in real-time, delays between matching electrical signals, comprising:

a measuring head having a first sensor providing a first signal and a second sensor providing a second signal situated at a fixed predetermined distance from one another;

n delay lines for storing successive samples of the first signal provided by the first sensor, where n is at least equal to two;

a generator of n different sampling frequencies;

said n different sampling frequencies being applied to said n delay lines respectively;

a direct line for storing successive samples of the second signal of the second sensor;

synchronization means for applying to the direct line the sampling frequency of one of the delay lines;

a temporary storage memory;

an adder having an output coupled to said temporary storage memory;

a multiplier coupled to said adder supplying said temporary storage memory, said multiplier being coupled to said n delay lines and to said direct line;

switching means for applying to the multiplier the samples stored in one of the delay lines;

a peak detector for detecting a peak of a correlation function calculated by said adder and multiplier; and a data comparator connected to the peak detector, to the synchronization means, to the switching means, and to the multiplier and adder.

9. The device of claim 8, wherein said generator provides at least three frequencies, further including selection means for applying two of said at least three frequencies at the same time to a different delay line, wherein said data comparator is operative to determine a peak of said correlation function.

10. The device of claim 9, further including at least two second sensors connected to said direct line, and wherein said data comparator is operative to switch to one of said at least two second sensors in response to position of said peak.

11. The device of claim 8, wherein said data comparator is operative to determine a peak of said correlation function, and further is operative to limit the calculation of said correlation function to a delay window centered on said peak.

12. The device of claim 11, further including a predicting filter, and wherein said data comparator is coupled to the predicting filter and cooperative therewith to center the delay window with respect to the peak of the correlation function.

* * * * *